(12) United States Patent
Le et al.

(10) Patent No.: US 11,946,398 B1
(45) Date of Patent: Apr. 2, 2024

(54) BROADBAND RESONATOR WITH AN ENTRAINED WATER REMOVAL SYSTEM FOR A FUEL CELL COMPRESSOR

(71) Applicant: MANN+HUMMEL GmbH, Ludwigsburg (DE)

(72) Inventors: Hung Le, Novi, MI (US); Eric Gallagher, Kalamazoo, MI (US); Hoa Le, Kalamazoo, MI (US)

(73) Assignee: MANN+HUMMEL GmbH, Ludwigsburg (DE)

(*) Notice: Subject to any disclaimer, the term of this patent is extended or adjusted under 35 U.S.C. 154(b) by 0 days.

(21) Appl. No.: 18/045,850

(22) Filed: Oct. 12, 2022

(51) Int. Cl.
*F01N 1/02* (2006.01)
*H01M 8/04111* (2016.01)
*H01M 8/04119* (2016.01)

(52) U.S. Cl.
CPC ........... *F01N 1/02* (2013.01); *H01M 8/04111* (2013.01); *H01M 8/04156* (2013.01); *H01M 2250/20* (2013.01)

(58) Field of Classification Search
CPC . F01N 13/18; F01N 1/06; F01N 1/023; F01N 1/02; F01N 1/003; F01N 3/005; F01N 2490/16; F01N 2490/02; F01N 2470/24; F01N 2240/32; F01N 1/026; F01N 2470/02; F01N 1/006; F01N 1/084; F01N 1/10; F01N 1/166; F01N 1/18; F01N 13/14; F01N 2290/06; F01N 2470/04; F01N 2470/08; F16L 55/033; G10K 11/172
See application file for complete search history.

(56) References Cited

U.S. PATENT DOCUMENTS

| | | | |
|---|---|---|---|
| 5,979,598 A | 11/1999 | Wolf et al. | |
| 7,934,581 B2 * | 5/2011 | Kim | F02M 35/1216 123/184.55 |
| 2002/0010470 A1 | 1/2002 | Lechot | |
| 2003/0085071 A1 * | 5/2003 | Boast | F01N 13/18 181/255 |
| 2003/0173146 A1 | 9/2003 | Wolf et al. | |
| 2006/0018038 A1 | 1/2006 | Suzuki | |
| 2015/0107935 A1 | 4/2015 | Dobrin et al. | |
| 2018/0142588 A1 | 5/2018 | Qi et al. | |

(Continued)

FOREIGN PATENT DOCUMENTS

| | | |
|---|---|---|
| CN | 207111277 U | 3/2018 |
| CN | 211737277 U | 10/2020 |

(Continued)

OTHER PUBLICATIONS

International Search Report in corresponding International Appln. No. PCT/EP2023/075073, dated Dec. 6, 2023, Rijswijk, Netherlands.

*Primary Examiner* — Anthony Ayala Delgado

(57) ABSTRACT

A broadband resonator for a fuel cell compressor is disclosed. The resonator having a resonator insert having a tubular pipe surrounded by a plurality of disc-shaped walls separating the resonator insert receiving chamber into one or more individual resonator chambers. The tubular pipe is positioned eccentrically within a resonator insert receiving chamber. An entrained water removal system is formed in the resonator, preventing entrained water from accumulating in the resonator chambers which would result in an undesirable detuning of the designed amplitude frequency spectrum response.

10 Claims, 7 Drawing Sheets

(56) References Cited

U.S. PATENT DOCUMENTS

| | | |
|---|---|---|
| 2018/0156172 A1 | 6/2018 | Jean et al. |
| 2020/0173321 A1 | 6/2020 | Han |

FOREIGN PATENT DOCUMENTS

| | | |
|---|---|---|
| CN | 212716943 U | 3/2021 |
| CN | 113027726 A | 6/2021 |
| CN | 213959000 U | 8/2021 |
| CN | 113738476 A | 12/2021 |
| CN | 215171079 U | 12/2021 |
| CN | 114233606 A | 3/2022 |
| CN | 216288535 U | 4/2022 |
| DE | 102007039683 A1 | 2/2008 |
| DE | 102013220686 A1 | 4/2015 |
| DE | 102019204072 A1 | 10/2020 |
| FR | 3002002 A1 | 8/2014 |
| JP | H05163925 A | 6/1993 |
| JP | 2018003845 A | 1/2018 |
| KR | 20120082166 A | 7/2012 |
| WO | 2019145259 A1 | 8/2019 |
| WO | 21129650 A1 | 7/2021 |
| WO | 21129707 A1 | 7/2021 |

\* cited by examiner

BROADBAND RESONATOR WITH AN ENTRAINED WATER REMOVAL SYSTEM FOR A FUEL CELL COMPRESSOR

TECHNICAL FIELD

The present invention relates to a broadband resonator for a hydrogen fuel cell, such as for fuel cell powered electric motor vehicles, EV trucks and other fuel cell applications. The fuel cell broadband resonator having an integrated water bypass system preventing entrained water in the generated in operation of the fuel cell from compromising or detuning the designed sound amplitude frequency spectrum of the fuel cell broadband resonator.

BACKGROUND OF THE INVENTION

Resonators or silencers are known for use in air induction systems for internal combustion engines. Such resonators may be applied to reduce the amplitude frequency spectrum of air pulsations. A resonator can be configured to resonate at, suppress or reflect sound waves at one or more frequencies so as to effectively modify the sound characteristics of the air intake system.

SUMMARY OF THE INVENTION

A primary objective of the present invention is to provide an innovative broadband resonator for a fuel cell vehicle air provisioning system or exhaust system designed to effectively reduce or attenuate the sound characteristics and vibration transmitted from operation of a hydrogen fuel cell compressor, while providing a novel entrained water draining system within the broadband resonator to capture and effectively drain away entrained water which may enter the resonator chambers along with the fuel cell gases, thereby preventing water accumulation in the resonator chambers and the undesired resonator chamber volume changes which in detuning or loss of the critical intended response characteristics of the broadband resonator.

In generally all aspects of the invention, the broadband resonator incorporates an innovative entrained water bypass system enabling entrained water in the inlet gases (water is by-product of the reaction of hydrogen and oxygen) to bypass the resonator chambers at a lower portion thereof, preventing water accumulation and the undesirable detuning of the designed amplitude frequency spectrum response.

In preferred aspects of the invention, to achieve the desired amplitude frequency spectrum response, a plurality of resonator chambers are provided in the broadband resonator, each individually tuned to effect the frequency response of one or more portions of the designed amplitude frequency spectrum response of the broadband resonator.

In aspects of the invention, the plurality of resonator chambers are preferably arranged axially one after another in within the housing of the broadband resonator. In preferred aspects of the invention, the plurality of resonator chambers separated from each other by partition walls interposed between adjacent resonator chambers.

In generally all aspects of the invention, the plurality of resonator chambers communicates with the fuel cell intake gas or exhaust gas stream through openings in the circumferential wall of the resonator pipe. As the gas stream may be expected to carry entrained water, entrained water can enter the plurality of resonator chambers through the openings in the circumferential wall of the resonator pipe.

In some aspects of the invention, the broadband resonator has a designed amplitude frequency spectrum response which is configured to act in a fuel cell compressor frequency range from 1 to 6 kHz to provide the designed amplitude frequency spectrum response of the broadband resonator.

In aspects of the invention, the resonator pipe may have a circular cross-section. In further aspects of the invention, the resonator pipe may have an elliptical cross-section or a polygonal cross section.

In aspects of the invention, the resonator pipe is configured to install into an interior of the broadband resonator housing such an outer wall of the resonator housing closes off a radially outer circumference of the resonator chambers.

In aspects of the invention, the annular disk-shaped walls are eccentrically positioned on the tubular pipe such that the tubular pipe is positioned eccentrically within the resonator insert receiving chamber, such that a lower portion of the circumferential outer wall of the tubular pipe is positioned substantially proximate to the radially inner enclosing surface of the resonator housing at a distance d1, while an upper portion of the circumferential outer wall of the tubular pipe is positioned further away from the radially inner enclosing surface of the resonator housing at a distance d2, with d2>d1, such that a resonance volume of the resonator chambers is arranged substantially at the upper portion of the circumferential outer wall of the tubular pipe.

The tubular pipe is provided with a plurality of resonator chamber entry holes spaced apart and extending radially through the circumferential outer wall into the resonance volume of respective resonator chambers. Preferably the plurality of resonator chamber entry holes are arranged in the upper portion of the circumferential outer wall of the tubular pipe. The plurality of resonator chamber entry holes cooperate with the resonator chambers to provide a designed amplitude frequency spectrum response of the broadband resonator, modifying or attenuating fuel cell compressor noise;

The annular disk-shaped walls have an outer circumference which closes against a radially inner surface of the resonator housing to divide a volume of the resonator insert receiving chamber into resonator chambers separated by the annular disk-shaped walls from each other. Notch openings formed in the annular disk-shaped walls, the notch openings extending radially inwardly from the outer circumference of the annular disk-shaped walls.

The broadband resonator further includes an entrained water removal system as a critical element to preventing entrained water in the fuel cell gases from accumulating in the resonator chambers, critically preventing an detuning or the loss of the designed amplitude frequency spectrum response of the broadband resonator.

Critically, entrained water drains from a lower portion of the resonator chambers through the notch openings and along the lower portion of the resonator chambers, forming a drainage channel draining water towards the outlet opening at the second axial end of the tubular pipe. The lower portion of the circumferential outer wall of the tubular pipe further includes an entrained water re-entry hole positioned proximate to the outlet opening at the second axial end of the tubular pipe and in fluid communication with the drainage channel; Entrained water removed from the resonator chambers re-enters an interior of the tubular pipe proximate to the outlet opening through the entrained water re-entry hole so as to exit the broadband resonator through the outlet opening together with the fuel cell gas flow through a common/shared the gas transmission pipe.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
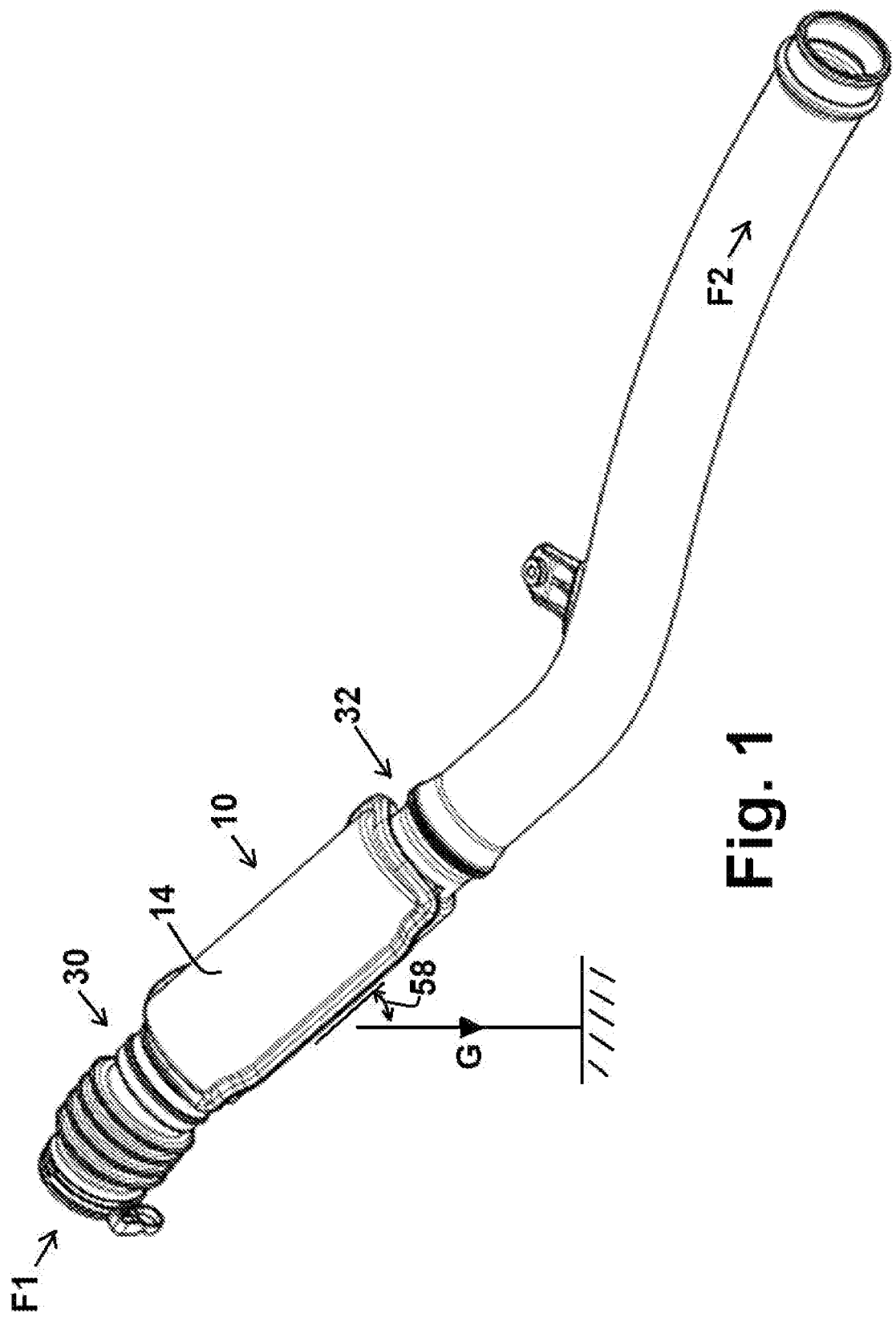
FIG. 1 depicts the disclosed broadband resonator for a fuel cell compressor, shown installed in a disclosed slanted position in a portion of a fuel cell gas piping system, consistent with the present inventive disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the broadband silencer/resonator for a fuel cell compressor. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 depicts the broadband resonator 10 for a fuel cell compressor according to the present inventive disclosure, shown installed in a disclosed critical slanted angular position in a portion of a fuel cell gas piping system, consistent with the present inventive disclosure. In FIG. 1, the broadband resonator 10 is shown installed downstream of a fuel cell and receiving the exhaust gases F1 carrying entrained water from the operation of a hydrogen fuel, such as, for example) in a fuel cell powered electric drive passenger car, truck and offroad heavy duty equipment. In other cases, the broadband resonator 10 may be installed upstream of the fuel cell and receiving air and hydrogen carrying gases and entrained water upstream of the fuel cell.

The broadband resonator 10 has its inlet 30 positioned above the broadband resonator outlet 32 such the that disclosed entrained water removal system efficiently removes entrained water entering from the resonator chambers, removing entrained water to prevent detuning of the broadband resonator's critical amplitude frequency spectrum response which would compromise or defeat the resonator, as discussed later herein. The broadband resonator 10 is installed at a slope angle (labeled as 58) relative to a direction of the force of gravity G, such that the inlet opening 30 is arranged above the outlet 32 and utilizes the force of gravity G to urge captured entrained water flow from the resonator chambers to flow in the drainage channel (54) in the interior of the broadband resonator 10 to flow to the outlet 32 where the water rejoins the fuel cell gas flow and is exits together with the fuel cell gases through the outlet 32 of the broadband resonator 10, flowing F2 in the downstream piping and eventually to the environment. As the fuel cell in generating electrical energy receives hydrogen and oxygen to form water and water vapor, the fuel cell exhaust gases are not expected to be harmful to the environment.

Figure 2:
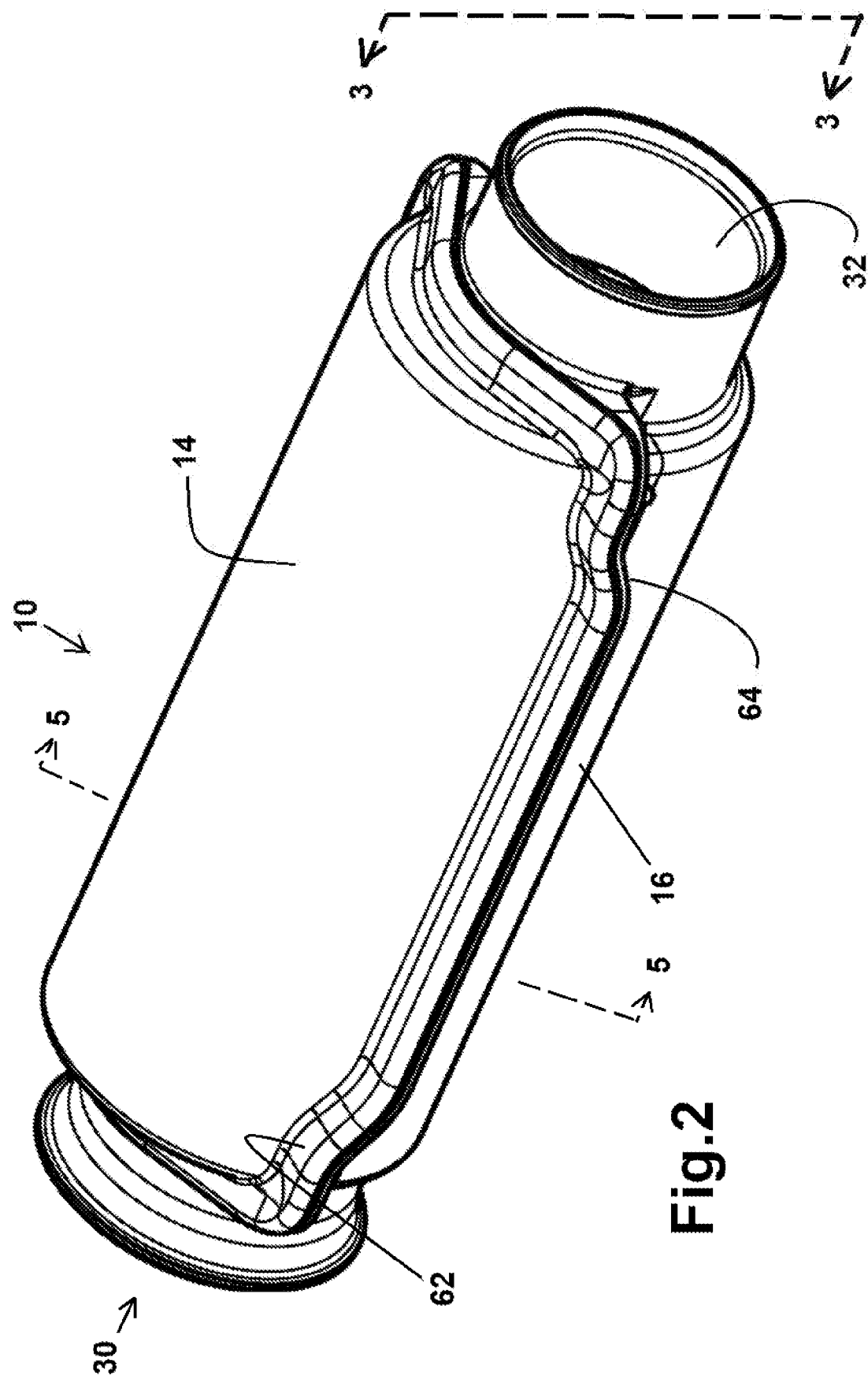
FIG. 2. depicts a perspective view of the broadband resonator having a first housing shell and second housing shell, consistent with aspects of the present inventive disclosure.

FIG. 2. depicts a perspective view of the broadband resonator 10 of FIG. 1 without the add on piping, the broadband resonator 10 having a first housing shell 14 mated to a second housing shell 16 to enclose the resonator tubular pipe 22 and resonator chambers 36, as discussed later herein. As shown, the broadband resonator 10 has an inlet opening 30 at a first axial end and an outlet opening 32 at an opposite second axial end. In the example of one non-limiting embodiment, the broadband resonator 10 has a first housing shell 14 mated to a second housing shell 16, although this arrangement is not critical to the invention and is only one possible configuration of the broadband resonator within the disclosed invention. In FIG. 2. the housing shells 14 and 16 are surrounded by outward projecting mating flanges 62, 64, as discussed further later herein. If FIG. 2, notice also the section lines 5-5 referring to the section view of FIG. 5, discussed later herein.

Figure 3:
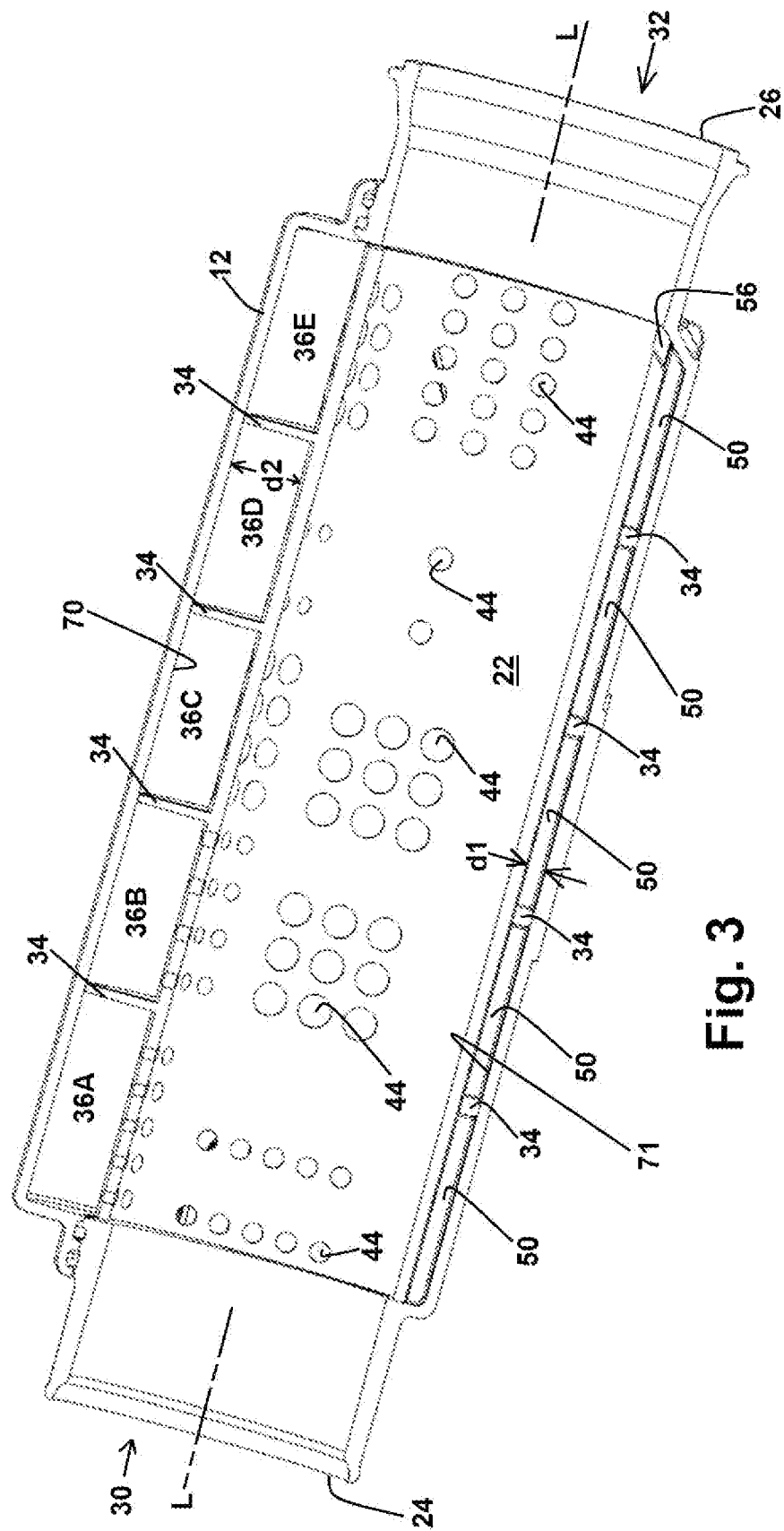
FIG. 3. depicts a vertical section view of the broadband resonator of FIG. 2 along section 3-3, showing internal details.

FIG. 3. depicts a vertical section view of the broadband resonator of FIG. 2 along section 3-3, showing internal details.

Figure 4:
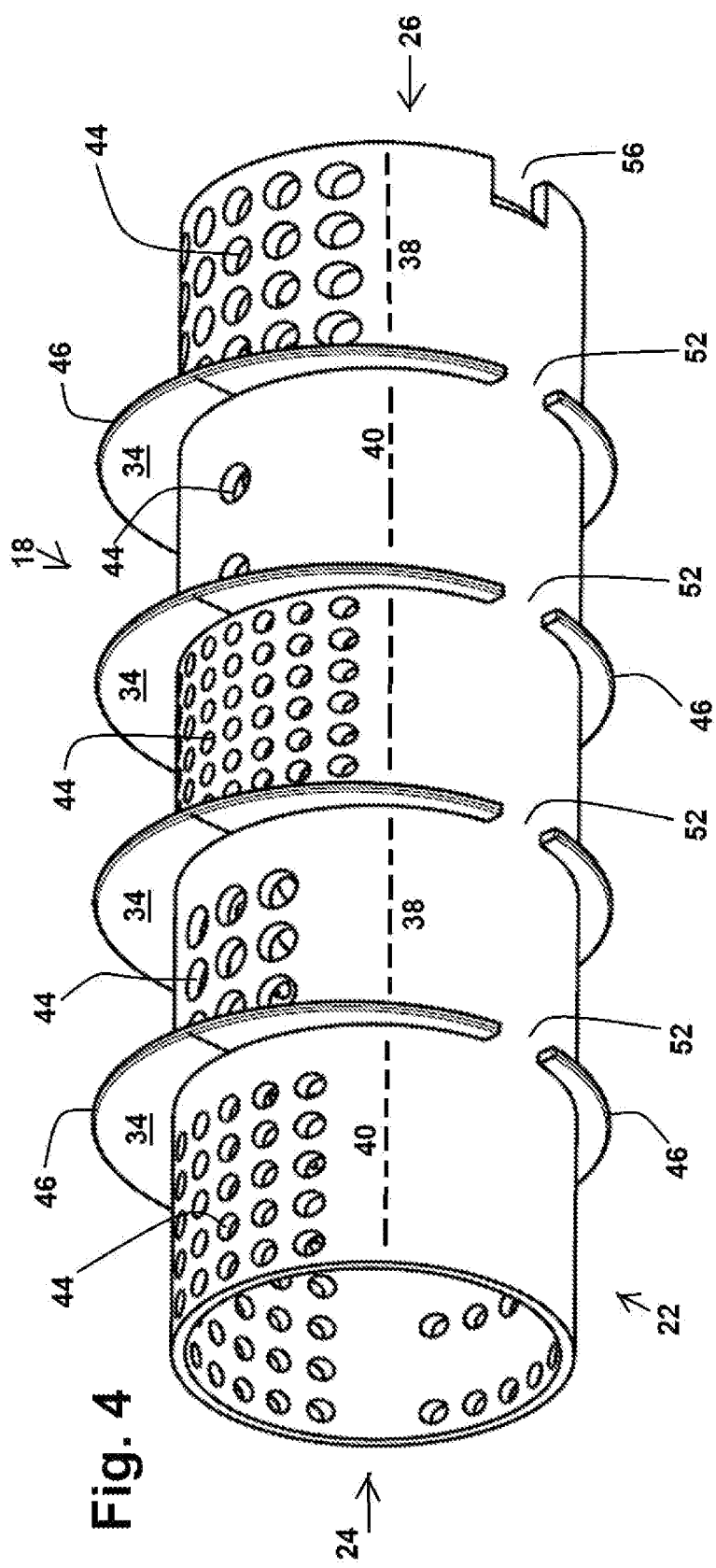
FIG. 4. depicts a perspective view of the resonator insert and tubular pipe, as a component of FIG. 3 and consistent with the present inventive disclosure.

FIG. 4 depicts a perspective view of the resonator insert 18 and tubular pipe 22, as a component of FIG. 3 and consistent with the present inventive disclosure.

The broadband resonator 10 has a resonator housing 12 includes at least one radially inner enclosing surface, enclosing a resonator insert receiving chamber into which the resonator insert 18 installed. The resonator insert includes a tubular pipe 22 elongated along a central axis (L) from a first axial end 24 to a second axial end 26. The tubular pipe 22 has a circumferential outer wall 22. A radial interior of the tubular pipe 22 forms a gas flow duct for guiding a fuel cell gas flow through the broadband resonator 10 from an inlet opening 30 at the first axial end 24 to an outlet opening 32 at the second axial end 26. A plurality of annular disk-shaped walls 34 are provided on and projecting radially outwardly from the circumferential outer wall 28 of the tubular pipe 22. Immediately adjacent annular disk-shaped walls 34 are spaced axially part from each other to define resonator chambers 36 therebetween. The resonator chambers are delimited by the immediately adjacent spaced annular disk-shaped walls 34, the outer surface of the tubular pipe 22 and the radially inner surface 70 of the resonator housing 12 defining a plurality of resonator chambers 36 (five resonator chambers are shown in the example embodiment, but the resonator may have any number of resonator chambers, as needed to achieve the intended frequency spectrum response). As shown in FIG. 3, the annular disk-shaped walls 34 are eccentrically positioned on the tubular pipe 22 such that the tubular pipe 22 is positioned eccentrically within the resonator insert receiving chamber of the resonator housing 12, such that a lower portion 38 (see FIG. 5) of the circumferential outer wall 28 of the tubular pipe 22 is positioned substantially proximate to the lower radially inner enclosing surface 71 of the resonator housing 12 at a spacing distance d1, while an upper portion 40 (see FIG. 5) of the circumferential outer wall 28 of the tubular pipe 22 is positioned further away from the upper radially inner enclosing surface 70 of the resonator housing 12 at a spacing distance d2, critically with distance d2>d1, such that the resonance volumes 42 of the resonator chambers 36 are arranged substantially at the upper portion 40 of the circumferential outer wall 28 of the tubular pipe. This arrangement is critical for at least two important reasons. First so the resonator volumes are substantially above, preferably 95% above any water in the water drainage channel 54 (see FIG. 5), so the designed amplitude frequency spectrum response of the broadband resonator 10 is not detuned or defeated by the presence of water being captured and drained by the entrained water removal system, and secondly, so the entrained water in the drainage channel to be which is reintroduced into the interior of the tubular pipe 22 at the outlet opening 30 flows freely to the outlet opening without restrictions. As shown, the lower portion of the tubular pipe 22 is preferably positioned substantially level with the outlet opening 30, so as to further avoid inhibiting the flow of the re-introduced water out of the outlet opening to exit with the fuel cell gases.

The tubular pipe 22 is provided with a plurality of resonator chamber entry holes 44 spaced apart and extending radially through the circumferential outer wall 28 into the resonance volume 42 of respective resonator chambers 36. The annular disk-shaped walls 34 have a radially outer circumference 46 which closes against a radially inner surface (70, 71) of the resonator housing 12 to divide a volume of the resonator insert receiving chamber into separate resonator chambers 36 which are separated from each other by the annular disk-shaped walls 34. The plurality of resonator chamber entry holes 44 cooperate with the engineered design and volume of the resonator chambers 36 to provide a critical designed amplitude frequency spectrum response of the broadband resonator, thereby modifying or attenuating fuel cell compressor noise or sound according to meet design intent requirements.

The broadband resonator 10 further includes an entrained water removal system preventing entrained water from accumulating in the resonator chambers 36, accumulation which would result in an undesirable detuning and defeating of the designed amplitude frequency spectrum response. The entrained water removal system may include at least one axially elongated rotational positioning rib 50 (FIG. 3 and FIG. 5) formed on the at least one lower radially inner enclosing surface 71 of the resonator housing 12, positioned proximate to the lower portion 38 (see FIG. 5) of the circumferential outer wall 28 of the tubular pipe 22. Notch openings 52 are formed in the annular disk-shaped walls 34 and, if present, may engage the at least one axially extending rotational positioning rib 50. The notch openings 52 extending radially inwardly from the outer circumference 46 of the annular disk-shaped walls 34 so as to preferably maintain a closed separation between adjacent resonator chambers 36. The notch openings 52 may engage the at least one axially extending rotational positioning rib 50, if provided, to effectively lock a rotational position of the tubular pipe 22 within the resonator insert receiving chamber 20, thereby ensuring the proper eccentric positioning of the tubular pipe 22 critical for the functioning of the entrained water removal system. During operation, fuel cell exhaust gases having entrained water may enter the resonator chambers 36 through the plurality of resonator chamber entry holes 44. Critically, the entrained water drains from a lower portion of the resonator chambers 36 through the notch openings 52 and flows along the bottom of the resonator chamber and may flow along or between the at least one axially extending rotational positioning rib 50, forming a drainage channel 64 draining water towards the outlet opening at the second axial end 26 where the water rejoins the fuel cell gas flow leaving the broadband resonator 10 at the outlet opening 32. The entrained water removed from the resonator chambers 44 by the drainage channel 64 re-enters an interior of the tubular pipe 22 proximate to the outlet opening 32, flowing through the entrained water re-entry hole 56 so as to freely exit the broadband resonator 10 at the outlet opening 32 together with the fuel cell gas flow. The plurality of resonator chamber entry holes 44 cooperate with the resonator chambers 36 to provide the designed amplitude frequency spectrum response of the broadband resonator, effectively modifying or attenuating fuel cell compressor noise according to design intent. The plurality of resonator chamber entry holes 44 are arranged in the upper portion 40 of the circumferential outer wall 28 of the tubular pipe (see FIG. 5, FIG. 4).

Figure 5:
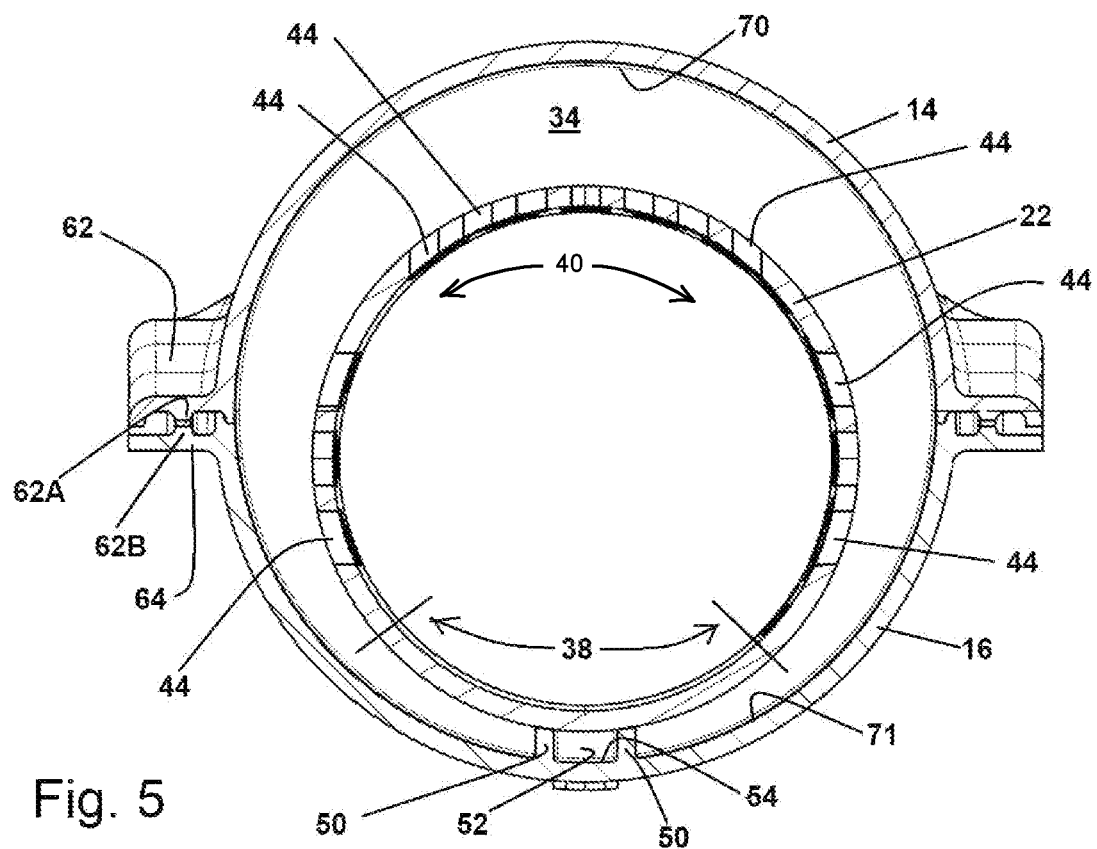
FIG. 5 depicts a section view, according to section 5-5 of FIG. 2, showing the water drainage channel and eccentric arrangement of the tubular pipe within the resonator housing, consistent with the present inventive disclosure.

FIG. 5 depicts a section view, according to section 5-5 of FIG. 2, showing the water drainage channel 52 and eccentric arrangement of the tubular pipe 22 within the resonator housing 12 (in this example 14+16). as shown in FIG. 5, preferably the at least one axially extending rotational positioning rib 50 is two axially extending rotational positioning ribs 50 which are proximately positioned and spaced apart circumferentially on the at least one radially inner enclosing surface 71 of the resonator housing. The circumferential spacing between the two axially extending rotational positioning ribs forming the drainage channel 54 therebetween, draining towards the outlet opening 32 at the second axial end 26. Preferably, the axially elongated rotational positioning rib(s), when provided, extend axially continuously across the resonator chamber 36 through the notch openings 56 of the annular disk-shaped walls 34, so as to form a continuous drainage channel to the entrained water re-entry hole 56 to exit the broadband resonator 10 through the outlet opening 32 together with the fuel cell gas flow.

As further shown in FIG. 5, preferably the plurality of resonator chamber entry holes 44 are arranged in the upper portion 40 of the circumferential outer wall 28 of the tubular pipe (see FIG. 5, FIG. 4) so the effective resonator chamber volume is not affected by entrained water at the bottom of the resonator chambers, as it drains. Preferably the lower portion 38 of the circumferential outer wall 28 is without resonator chamber entry holes 44. Preferably the plurality of resonator chamber entry holes 44 are displaced at least 20 degrees away from the notch openings 52 of the annular disk-shaped walls 34 relative to the central axis (L) such that the lower portion 38 of the circumferential outer wall 28 is without resonator chamber entry holes 44. More preferably, the plurality of resonator chamber entry holes 44 are displaced at least 30 degrees away from the notch openings 52 of the annular disk-shaped walls 34 relative to the central axis (L).

Figure 6:
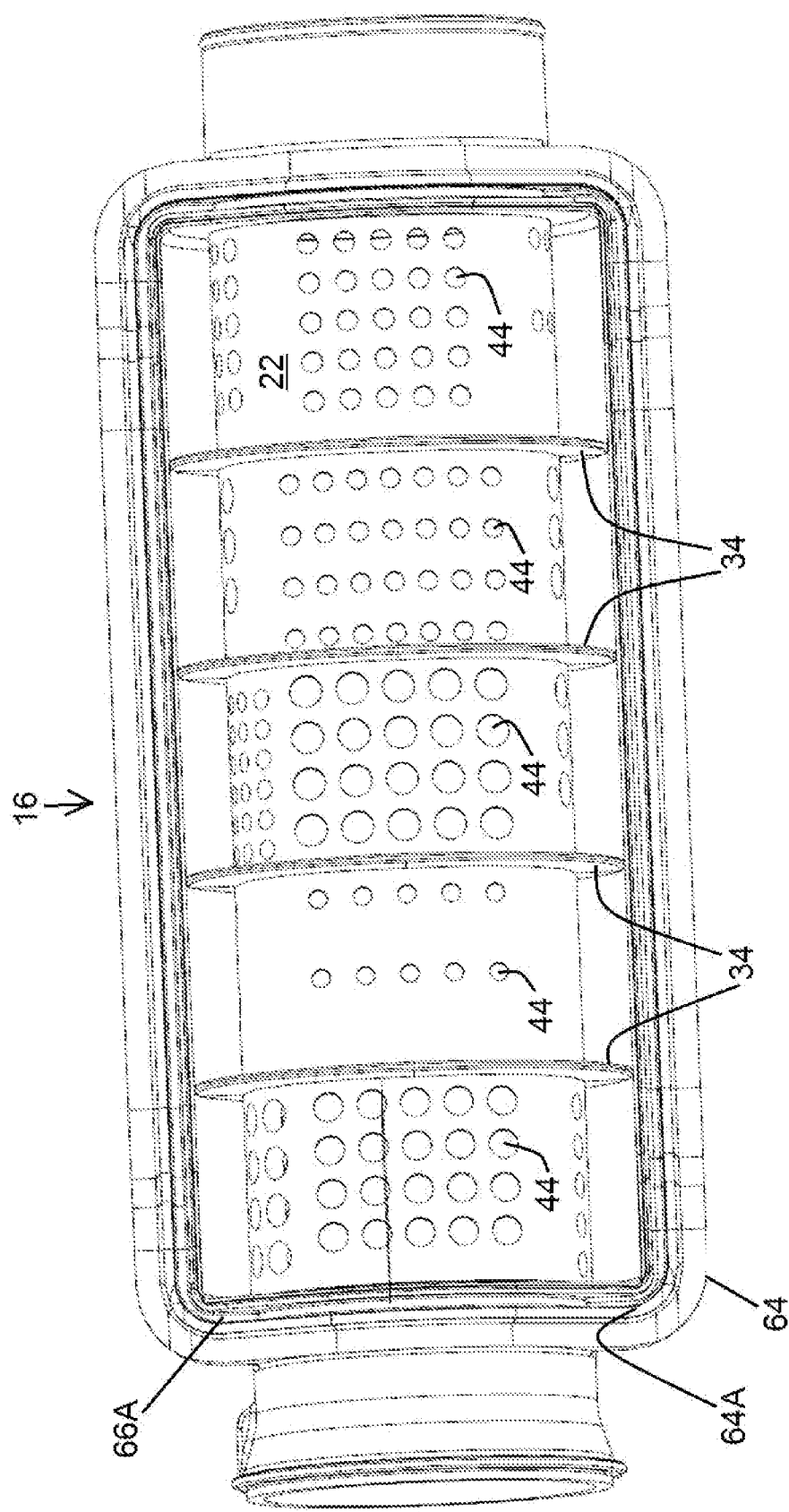
FIG. 6. depicts the broadband resonator of FIG. 2 without the first housing shell, showing the installation of the resonator insert and tubular pipe in the interior of the second housing shell and the general arranged of features discussed and claimed later herein.

FIG. 6. depicts the broadband resonator 10 of FIG. 2n shown here without the first housing shell 14, and showing the installation of the resonator insert 18 and tubular pipe 12 in the interior of the second housing shell 16 and depict the features discussed previously with FIGS. 3, 4 and 5. Further depicted is the circumferential outwardly projecting flange 64 of the second housing shell 16 having a welding projection rib 64A. The welding projection rib 64A spaced at least 5 mm outwardly away from the tapered alignment feature 66B. The spacing of the welding projection rib 64A protects the tapered alignment feature 66B from thermal damage during infrared or thermal welding of the outwardly projecting flanges (62,64). The housing shells and welded together and sealed together along the mating welding projection ribs of the housing shells.

Figure 7:
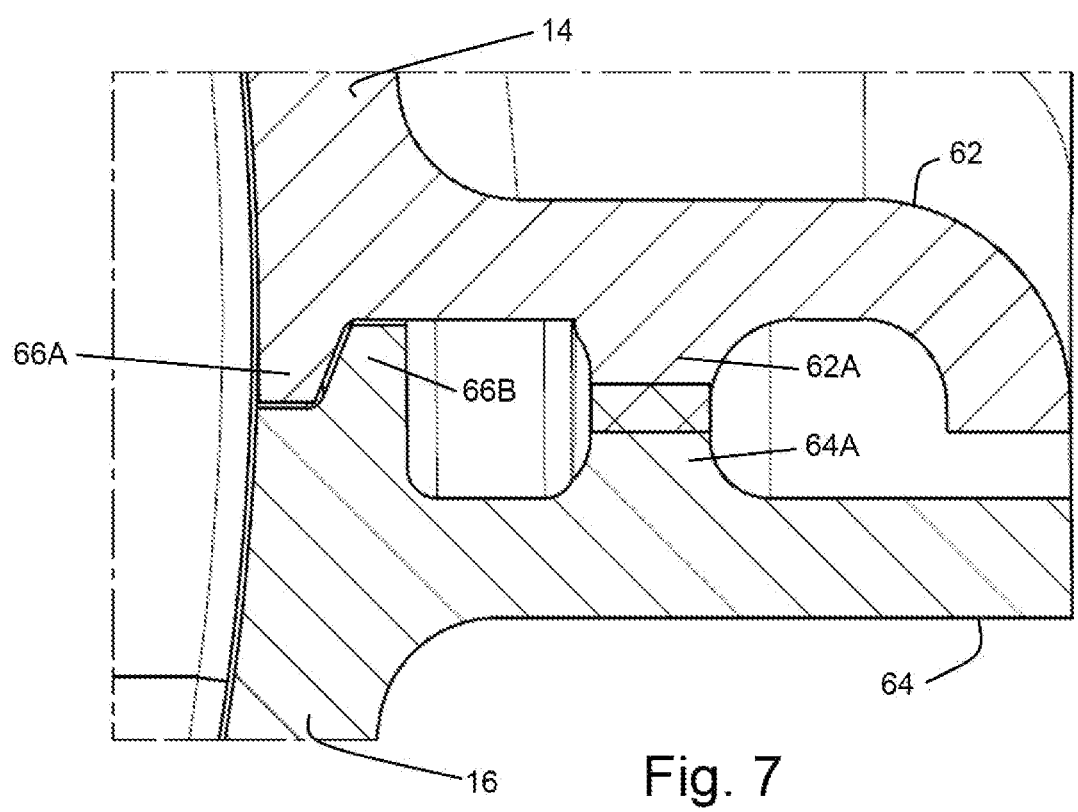
FIG. 7. depicts an enlarged view of FIG. 5's radially outwardly projecting mating flanges of the housing shells and the arrangement of the housing shell tapered alignment features and welding project ribs, consistent with the present inventive disclosure.

FIG. 7. depicts in enlarged detail the radially outwardly projecting mating flanges (62,64) of the housing shells (14,16) and the arrangement of the housing shell tapered alignment features (66A, 66B) and welding projection ribs (62A and 64A).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

DRAWING REFERENCE LABELS

10 Broadband Resonator
12 Resonator housing
14 First housing shell
16 Second housing shell
18 Resonator insert
20 Resonator insert receiving chamber
22 Tubular pipe
24 First axial end
26 Second Axial end
28 Circumferential outer wall of 22
30 Inlet opening at 24
32 Outlet opening at 26
34 Annular disk-shaped walls
36 Resonator chambers a,b,c . . .
38 Lower portion of circumferential outer wall 28
40 Upper portion circumferential outer wall 28
42 Resonance volumes of individual resonator chambers
44 Resonator chamber entry holes
46 Outer circumference of 34
48 Entrained water removal system
50 Rotational positioning rib
52 Notch opening of 34
54 Drainage channel
56 Entrained water re-entry hole
58 Slope angle
60 Direction of gravity (G)
62 First radially outwardly projecting flange
64 Second radially outwardly projecting flange
66A,66B Tapered alignment feature
62A,64A Welding projection rib (62A, 64A)
70 Radially inner surface of the resonator housing
72 Lower radially inner enclosing surface of housing

What is claimed is:

1. A broadband resonator for a fuel cell compressor, comprising:
    a resonator housing having at least one radially inner enclosing surface, enclosing a resonator insert receiving chamber therein;
    a resonator insert installed into the resonator insert receiving chamber, the resonator insert comprising:
        a tubular pipe elongated along a central axis from a first axial end to a second axial end, the tubular pipe having a circumferential outer wall,
        wherein a radial interior of the tubular pipe forms a gas flow duct for guiding a fuel cell gas flow through the broadband resonator from an inlet opening at the first axial end to an outlet opening at the second axial end;
        a plurality of annular disk-shaped walls provided on and projecting radially outwardly from the circumferential outer wall of the tubular pipe, adjacent ones of the annular disk-shaped walls spaced axially part from each other to define resonator chambers therebetween,
    wherein the annular disk-shaped walls are eccentrically positioned on the tubular pipe such that the tubular pipe is positioned eccentrically within the resonator insert receiving chamber, such that a lower portion of the circumferential outer wall of the tubular pipe is positioned substantially proximate to the radially inner enclosing surface of the resonator housing at a distance d1, while an upper portion of the circumferential outer wall of the tubular pipe is positioned further away from the radially inner enclosing surface of the resonator housing at a distance d2, with d2>d1, such that a resonance volume of the resonator chambers is arranged substantially at the upper portion of the circumferential outer wall of the tubular pipe;
    wherein the tubular pipe is provided with a plurality of resonator chamber entry holes spaced apart and extending radially through the circumferential outer wall into the resonance volume of respective resonator chambers, wherein the plurality of resonator chamber entry holes are arranged in the upper portion of the circumferential outer wall of the tubular pipe;

wherein the annular disk-shaped walls have an outer circumference which closes against a radially inner surface of the resonator housing to divide a volume of the resonator insert receiving chamber into resonator chambers separated by the annular disk-shaped walls;

wherein the plurality of resonator chamber entry holes cooperate with the resonator chambers to provide a designed amplitude frequency spectrum response of the broadband resonator, modifying or attenuating fuel cell compressor noise;

wherein the broadband resonator further includes an entrained water removal system preventing entrained water from accumulating in the resonator chambers, preventing an undesirable detuning of the designed amplitude frequency spectrum response, the entrained water removal system comprising:

a notch openings formed in the annular disk-shaped walls, the notch openings extending radially inwardly from the outer circumference of the annular disk-shaped walls;

wherein entrained water drains from a lower portion of the resonator chambers through the notch openings and along the lower portion of the resonator chambers, forming a drainage channel draining water towards the outlet opening at the second axial end;

wherein the lower portion of the circumferential outer wall of the tubular pipe further includes an entrained water re-entry hole positioned proximate to the outlet opening at the second axial end of the tubular pipe and in fluid communication with the drainage channel;

wherein entrained water removed from the resonator chambers re-enters an interior of the tubular pipe proximate to the outlet opening through the entrained water re-entry hole so as to exit the broadband resonator through the outlet opening together with the fuel cell gas flow.

2. The broadband resonator for a fuel cell compressor according to claim 1, wherein the entrained water removal system further includes:

at least one axially elongated rotational positioning rib formed on the at least one radially inner enclosing surface of the resonator housing extending along the lower portion of the resonator chambers;

wherein the notch openings formed in the annular disk-shaped walls receive and engage the at least one axially extending rotational positioning rib, the notch openings extending radially inwardly from the outer circumference of the annular disk-shaped walls, the notch openings engaging the at least one axially extending rotational positioning rib to lock a rotational position of the tubular pipe within the resonator insert receiving chamber;

wherein entrained water drains from a lower portion of the resonator chambers through the notch openings and along the at least one axially extending rotational positioning rim, further forming the drainage channel draining water towards the outlet opening at the second axial end to the entrained water re-entry hole.

3. The broadband resonator for a fuel cell compressor according to claim 2, wherein the at least one axially extending rotational positioning rib is two axially extending rotational positioning ribs which are proximately positioned and spaced circumferentially apart on the at least one radially inner enclosing surface of the resonator housing, the circumferential spacing between the two axially extending rotational positioning ribs forming the drainage channel therebetween, draining towards the outlet opening at the second axial end.

4. The broadband resonator for a fuel cell compressor according to claim 1, wherein the plurality of resonator chamber entry holes are displaced at least 20 degrees away from the notch openings of the annular disk-shaped walls relative to the central axis.

5. The broadband resonator for a fuel cell compressor according to claim 4, wherein the plurality of resonator chamber entry holes are displaced at least 30 degrees away from the notch openings of the annular disk-shaped walls relative to the central axis.

6. The broadband resonator for a fuel cell compressor according to claim 1, wherein the broadband resonator is installed for operation at a slope angle, such that the central axis (L) is arranged at a slope angle (58) of between 20 degrees and 80 degrees relative to a direction of gravity (G) such that the inlet opening of the tubular pipe arranged above the outlet opening, relative to the direction of a force of gravity (G);

wherein the slope angle cooperates with the force of gravity to urge water flow in the drainage channel to flow to the entrained water re-entry hole to exit the broadband resonator through the outlet opening.

7. The broadband resonator for a fuel cell compressor according to claim 1, wherein the resonator housing has:

a first housing shell; and a second housing shell;

wherein, when the first and the second housing shells are mated together in an assembled state, the housing shells cooperate to enclose the resonator insert receiving chamber therein.

8. The broadband resonator for a fuel cell compressor according to claim 7, wherein the first housing shell has a first radially outwardly projecting flange formed a radially outer side of the first housing shell;

wherein the second housing shell has a second radially outwardly projecting flange formed a radially outer side of the second housing shell;

wherein the radially outwardly projecting flanges are configured to align and mate together.

9. The broadband resonator for a fuel cell compressor according to claim 8, wherein at least one of the housing shells includes a tapered alignment feature proximate to the outwardly projecting flange;

wherein the tapered alignment feature acts to move the first and second housing shells into alignment to form a sealed closure between the housing shells.

10. The broadband resonator for a fuel cell compressor according to claim 9, wherein the outwardly projecting flanges of the housing shells include a welding projection rib, the welding projection ribs spaced at least 5 mm outwardly away from the tapered alignment feature;

wherein the spacing of the welding projection ribs protects the tapered alignment feature from thermal damage during infrared or thermal welding of the outwardly projecting flanges.

\* \* \* \* \*